United States Patent

Juchmann et al.

[15] 3,673,308

[45] June 27, 1972

[54] SILICON WAFER CELL

[72] Inventors: Heinz Juchmann, Belecke; Peter Lauterbach, Kallenkardt, both of Germany

[73] Assignee: Licentia Patent-Verwaltings G.m.b.H., Frankfurt am Main, Germany

[22] Filed: April 28, 1971

[21] Appl. No.: 138,030

[30] Foreign Application Priority Data

April 30, 1970 Germany ......................P 20 21 158.9

[52] U.S. Cl. ..........................174/52 S, 174/50.5, 317/234 R

[51] Int. Cl. ..........................................................H02g 5/00

[58] Field of Search ..................174/52 S, 50.64, 50.5, 50.63, 174/50.53, 50.54; 317/234 A, 234 G, 234 R

[56] References Cited

UNITED STATES PATENTS

| | | | |
|---|---|---|---|
| 3,499,095 | 3/1970 | Haus | 174/52 S |
| 3,539,704 | 11/1970 | Sator et al. | 174/52 S |

*Primary Examiner*—Darrell L. Clay
*Attorney*—Spencer & Kaye

[57] ABSTRACT

In a ceramic housing, a silicon wafer is held centered with respect to the housing by a flat tensioning ring having three protrusions on its inner periphery and three protrusions on its outer periphery, the three protrusions on the outer periphery being in contact with the inner wall of the housing, the three protrusions on the inner periphery being in contact with the outer edge surface of a carrier disc on which the wafer is securely mounted.

2 Claims, 2 Drawing Figures

*Inventors.*
Heinz Juchmann
Peter Lauterbach
BY Spencer & Kaye
ATTORNEYS.

SILICON WAFER CELL

BACKGROUND OF THE INVENTION

The present invention relates to a wafer cell containing a silicon wafer element held for pressure contacting and cooling on its flat sides. The flat sides of the wafer element are provided with electrodes. The wafer element is secured on a carrier disc and is held in an annular ceramic housing between two circular membrane-like contacting sheets connectable with the ceramic housing.

In known wafer cells, two brass rings, carried by insulating supports and held separated in an annular cell housing, form a cage. These rings have the same outer diameter but different inner diameters. One circular carrier disc of metal and one circular contact disc, between which a silicon wafer element has been alloyed in place, are set into these two rings of the cage. The wafer element exhibits a small amount of play in the direction of its diameters relative to the brass rings and to the cell housing. On the two ends of the housing are placed annular discs of metal surrounding portions of the outer housing surface-like lids. Saucer-shaped circular membrane-like contact sheets are secured to the inner edges of the annular discs to provide pressure contacting to the wafer element.

The outer diameter of the brass rings is about equal to the inner diameter of the cell housing. Nevertheless, there is always a slight amount of play, so that the maintenance of an exact placement of the wafer element relative to the saucer-shaped contact sheets cannot be guaranteed. A jolt can change the relative placement. This deficiency in construction can only be combatted by requiring a considerable precision in the manufacture of the cell housing and the brass rings. And, as already mentioned above, there is also a certain amount of play between the brass rings and the wafer element.

Should the cage have only a small diameter-play relative to the cell housing, for example, a play of 0.5 to 1 millimeter, there nevertheless results that the thermal and electrical resistance of the wafer cell can change. Thus, thermal and electrical contact between the carrier disc and contact sheet on one side and between contact disc and contact sheet on the other side is effected through microcontact locations. Should the wafer cell receive any jolt during handling, the microcontact locations can be changed by a shifting of the wafer element relative to the contact sheets and this results in a change in the thermal and electrical parameters which were measured just after final assembly of the wafer cell. This is an undesirable situation where the thermal and electrical behavior data of wafer cells must lie within narrow tolerance limits.

SUMMARY OF THE INVENTION

An object of the invention, therefore, is to provide a wafer cell of the above-described type and having structure assuring permanent location of the wafer element relative to the cell housing, so that permanent thermal and electrical data are obtained.

This as well as other objects which will become apparent in the discussion which follows are achieved, according to the present invention, by a flat tensioning ring having three protrusions on its inner periphery and three protrusions on its outer periphery, head surfaces of the protrusions on the inner periphery fitting with force against an edge-surface of a carrier disc secured on a silicon wafer element, head surfaces of the protrusions on the outer periphery fitting with force against an inner wall surface of the housing, whereby there is achieved a fixed centering of the wafer element in the cell housing and consequently permanent data for thermal and electrical behavior of the wafer cell.

DESCRIPTION OF THE PREFERRED EMBODIMENTS

Figure 1:
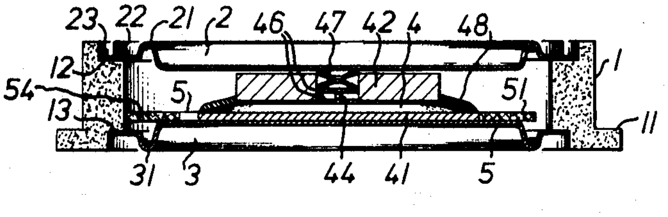
FIG. 1 is a sectional view taken as indicated by the line 1—1 of FIG. 2.
Figure 2:
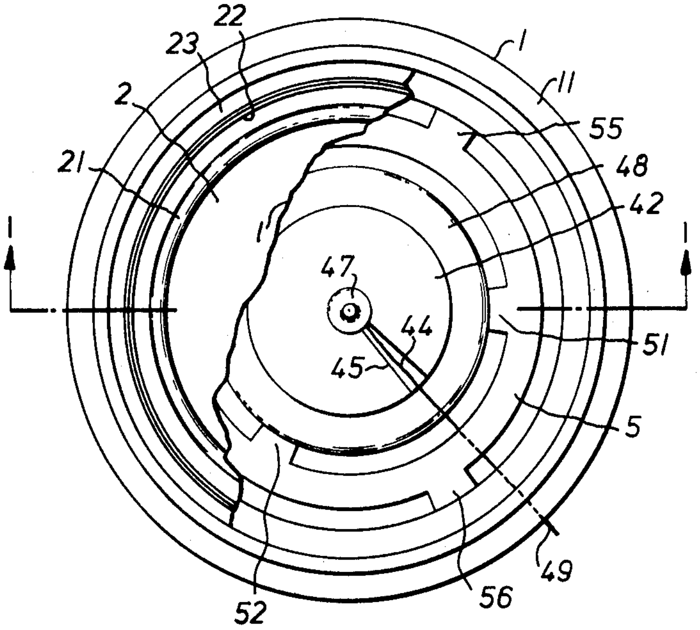
FIG. 2 is a plan view of a wafer cell according to the invention, with portions broken away.

The cell housing 1 of the wafer cell illustrated in FIGS. 1 and 2 is an annular ceramic ring having an outer flange 11 on its lower side. On the upper and lower sides of the housing are provided inwardly facing steps 12 and 13. A sheet metal support ring 23 having an L-shaped cross section and made of Vacon (Ni-Fe) is soldered onto the upper step 12 and supports the membrane-like contact sheet 2 of copper which closes the upper end of the cell. Sheet 2 has been broken away along the line 1 in FIG. 2, in order to expose the interior of the cell.

Contact sheet 2 is provided with an annular bead 21 and an edge 22 bent vertically upwards to rest against ring 23 when sheet 2 has been placed in the position shown. The lower side of the cell is closed by contact sheet 3 likewise possessing an annular bead 31, but no vertically bent edge. Contact sheet 3 is soldered at its edge to the lower step 13.

Thyristor wafer element 4 is shown situated within housing 1. This wafer element, which has a central control electrode, is secured to carrier disc 41 and lies with the interposition of this disc 41 on contact sheet 3. The cathode principal surface of the wafer element is covered with a silver-coated contact disc 42 of copper. The contact disc is circular like the wafer element itself and is provided with a radial slit 45 through which an insulated control connection lead 44 passes. The radially inner end of the control connection lead 44 lies between two insulating discs 46 set into the ring-shaped contact disc 42. Above the insulating discs 46 are two spring discs 47, of which the upper protrudes somewhat out of the contact disc 42. The inclined edge of the thyristor wafer element 4 is provided in a known manner with a protective lacquer 48 and this lacquer can be utilized for fixing the contact disc 42 in place.

In order to accomplish the object of the invention to hold the wafer element 4 with carrier disc 41 and contact disc 42 in a permanently centered position, flat insulating tensioning ring 5 is positioned between the edge of carrier disc 41 and the inner wall surface of annular housing 1. Ring 5 may be made, for example, of a silicone laminated fabric. The inner periphery of this ring 5 is provided with three protrusions 51 to 53 separated from one another by 120°. The outer periphery of the ring has three protrusions 54 to 56 likewise separated from one another by 120°. The head surfaces of these protrusions fit with force against respectively the edge surface of carrier disc 41 and the inner wall surface of annular housing 1. The protrusions on the inner periphery of ring 5 are shifted 60° with respect to those on the outer periphery. Carrier disc 41 with thyristor wafer element 4 and contact disc 42, as well as insulated tensioning ring 5, can be placed with ease upon the contact sheet 3 closing the lower end of the cell housing when the contact sheet 2 has not yet been put in place. This yields the permanent centering of parts 4, 41, and 42. Finally, contact sheet 2 is set in place on the upper end of the housing and welded with the sheet metal support ring 23 along edge 22 while it is being held in contact with the contact disc 42. After the welding, there is obtained a permanent pressure contact between sheet 2 and contact disc 42, the sheet 2 resting against disc 42 with a spring bias. At the same time, sheet 2 presses against spring discs 47 to hold the radially inwards end of lead 44 in contact with the central control electrode. The other end of the control connection lead 44 is led through the housing 1 and connected on the outside of the annular housing with control lead 49.

It has proven advantageous for the welding of the contact sheet 2 with the sheet metal support ring 23 to provide the edge zone of the contact sheet 2 from edge 22 inwardly beyond bead 21 as a special metal ring made of Vacon, this special metal ring being welded along its inner edge with the main contact sheet portion of copper.

The spacing of the protrusions on ring 5 by 120° and the 60° shift of the inner protrusions relative to the outer protrusions has the advantage that, for example, the springiness of an entire 120° section symmetrically absorbs the force with which an outer protrusion bears against the inner wall surface of annular housing 1.

It will thus be seen that the present invention provides a secure three-point radial seating of a wafer element within an insulating ring as well as of the insulating ring within a cell housing. This is accomplished with simple cell construction and components. The resulting wafer cell can be set into, and removed from, a pressure contacting device as often as desired, because the wafer element is always brought under the same pressure action through the same microcontact locations of the carrier disc, the contact disc, and the contact sheets. After the first insertion of the wafer cell into a pressure contacting device, repeated insertions continue to enlarge the initially formed contact locations until they are enlarged to a constant effective total contact surface to improve the thermal and electrical internal resistance of the wafer cell.

Vacon is an alloy having a composition of

| | | | |
|---|---|---|---|
| 28 weight-% nickel, | 18 weight-% cobalt, 5 | 4 weight-% iron | (Vacon 10) |
| or | | | |
| 26 weight-% nickel, | 23 weight-% cobalt, 5 | 1 weight-% iron | (Vacon 20) |
| or | | | |
| Vacon 10 | with a small percentage of Cr | | (Vacon 12). |

Silicone laminated fabric is sold under the trademark designation "Detaktan". The manufacturer's name and address is
Detakta
vormals: Pfeiffer & Co., Isolier- und MeBtechnik, Hamburg 20, Eppendorfer LandstraBe 14.

Some pertinent physical parameters are compiled in the following list

| | |
|---|---|
| temperature stability | :up to 250° C permanently up to 300° C transiently |
| heat conductivity | :0.0004 Cal·cm/cm²/° C/sec |
| coefficient of dilation | :50·10⁻⁶/° C (linear) |
| density | :1.82 g/cm³ |

| | |
|---|---|
| hygroscopicity | :4 mg/24 h/1.5 mm/cm² |
| resistance to compression | :3150 kg/cm² |
| tensile strength | :1750 kg/cm² |
| resistance to rupture | :1600 kg/cm² |
| electrical insulation value | :18 Kilovolts/90°C/1.5 mm test thickness |
| electrical insulation value (parallel to lamination) | :70 Kilovolts/90°C/1.5 mm test thickness |
| electrical volume resistance | :$10^{11}$ Ohm·cm³ after 24 hours in a water bath (25° C) |
| electrical surface resistance | :$5\cdot10^{10}$ Ohm after 24 hours in a water bath (25° C) |
| dielectric constant | :4.3 at $10^6$ cps |
| dissipation factor (tanζ) | :0.01 at 800 cps and 20° C 0.005 at $10^6$ cps and 20° C |

It will be understood that the above description of the present invention is susceptible to various modifications, changes and adaptations, and the same are intended to be comprehended within the meaning and range of equivalents of the appended claims.

What is claimed is:

1. A wafer cell comprising a silicon wafer element having electrodes on its flat sides, a carrier disc, the wafer element secured on the carrier disc, a ceramic housing peripherally surrounding the wafer element, contact sheet means closing said housing and allowing pressure contacting to both of the flat sides of said wafer element, and means centering the wafer element within said housing without play, said centering means comprising a flat tensioning ring having three protrusions on its inner periphery and three protrusions on its outer periphery, head surfaces of the protrusions on the inner periphery fitting with force against an edge surface of said carrier disc, head surfaces of the protrusions on the outer periphery fitting with force against an inner wall of said housing.

2. A wafer cell as claimed in claim 1, the protrusions on the inner periphery being separated from one another by 120°, the protrusions on the outer periphery being separated from one another by 120°, the protrusions of the inner periphery being shifted 60° relative to the protrusions of the outer periphery.

* * * * *